United States Patent
Fulczyk et al.

(10) Patent No.: US 6,832,167 B2
(45) Date of Patent: Dec. 14, 2004

(54) METHOD OF THE IDENTIFICATION OF WEAK AND/OR STRONG BRANCHES OF AN ELECTRIC POWER TRANSMISSION SYSTEM

(75) Inventors: Marek Fulczyk, Kedzierzyn-Kozle (PL); Marian Sobierajski, Wroclaw (PL); Joachim Bertsch, Kilchberg (CH)

(73) Assignee: ABB Technology AB, Zurich (CH)

( * ) Notice: Subject to any disclaimer, the term of this patent is extended or adjusted under 35 U.S.C. 154(b) by 0 days.

(21) Appl. No.: 10/325,967

(22) Filed: Dec. 23, 2002

(65) Prior Publication Data

US 2003/0144802 A1 Jul. 31, 2003

(30) Foreign Application Priority Data

Dec. 24, 2001 (PL) .................................................. 351363

(51) Int. Cl.$^7$ ................................................ G06F 7/02
(52) U.S. Cl. ............................ 702/57; 702/58; 702/60; 702/64; 702/90
(58) Field of Search ........................ 702/57, 58, 60–62, 702/182, 183, 185, 189; 307/31; 700/292; 703/13; 361/65

(56) References Cited

U.S. PATENT DOCUMENTS

| | | | |
|---|---|---|---|
| 5,625,751 A | * | 4/1997 | Brandwajn et al. ........... 706/20 |
| 5,642,000 A | * | 6/1997 | Jean-Jumeau et al. ........ 307/31 |
| 5,745,368 A | | 4/1998 | Ejebe et al. ................. 364/483 |
| 5,796,628 A | * | 8/1998 | Chiang et al. .............. 700/295 |
| 6,496,757 B1 | * | 12/2002 | Flueck et al. ............... 700/292 |
| 6,654,216 B2 | * | 11/2003 | Horvath et al. ............... 361/65 |

FOREIGN PATENT DOCUMENTS

EP             1134867           9/2001

* cited by examiner

*Primary Examiner*—Marc S. Hoff
*Assistant Examiner*—Felix Suarez
(74) *Attorney, Agent, or Firm*—Burns, Doane, Swecker & Mathis, LLP

(57) ABSTRACT

The subject of the invention is a method of identification of weak and/or strong branches of an electric power transmission system. In the inventive method electrical parameters characterizing the nodes and branches of an electric power transmission system are subjected to computational treatment in order to obtain equations of power flow in all nodes of the system at assumed 100 percent system load value. Then an electric model of a branch is assumed and a curve P-Q is constructed which shows the functional relation between active and reactive load in the system. For the assumed branch model a branch voltage stability coefficient is determined. Then the analysed system is overloaded by increasing the total system load up to 120% base load and the branch voltage stability coefficient is determined again. The numerical values of the appropriately determined coefficients are compared with threshold values considered to be a safe margin for the maintenance of voltage stability for the given branch.

8 Claims, 3 Drawing Sheets

METHOD OF THE IDENTIFICATION OF WEAK AND/OR STRONG BRANCHES OF AN ELECTRIC POWER TRANSMISSION SYSTEM

FIELD OF THE INVENTION

The subject of the invention is a method for the identification of weak and/or strong branches of an electric power transmission system comprising at least one generator and nodes, interconnected by transmission lines, useful especially for the determination of the weak branches of the analyzed system. The method for the determination of the weak branches of a power system employs known methods of determining the voltage stability of the whole system and predicts the voltage stability margin in specific branches of the power system.

BACKGROUND OF THE INVENTION

From U.S. Pat. No. 5,745,368 there is known a method of voltage stability analysis in electric power systems. That description discloses a method which is appropriate for low and high voltage applications as well as differing types of loads and load variations. In that method, a nose point of a P-Q curve showing functional relation between voltage and power is found, from which the distances to points characterizing the reactive, active and apparent power are calculated, while a generalised curve fit is used to compute the equivalent or surrogate nose point. The determination of that point is achieved by approximating a stable branch and creating a voltage versus power curve, determining a plurality of stable equilibrium points on the voltage and load curve, using the plurality of determined stable equilibrium points to create and fit an approximate stable branch, calculating an approximate voltage collapse point and thereafter a voltage collapse index. The value of that index allows for predicting the occurrence of expected voltage collapse under specific conditions.

From a European patent application No. EP 1 134 867 there is known a method for the assessment of stability of electric power transmission networks. The method comprises the measurement of vector quantities for voltage and current in numerous points in the network, transfer of those data to the system protection center, transfer of information regarding the operating condition of equipment in the substations of that network, and, on the basis of the acquired data, determination of at least one stability margin value of the transmission network. The measured vectors may be represented by quantities such as voltage, current, power, or energy connected with phase conductor or an electronic system.

The method for the identification of weak and/or strong branches of an electric power system according to the invention can be possibly employed as a useful solution for the assessment of stability of power networks, for example, in the solution presented in the application EP 1 134 867, although the identification of weak branches in networks is made apart from the methods of network stability assessment as presented in the state of the art, and the method as such is not yet known.

On the other hand, from U.S. Pat. No. 5,796,628 there is known a dynamic method for preventing voltage collapse in electric power systems. In the presented solution "weak areas" in networks are identified. These areas are defined as those parts of the network which do not withstand additional load. The solution introduced in that description consists in monitoring the power network through the surveillance of real-time data from the network, forecasting the near-term load of each branch of the network as well as the power demand in that branch on the basis of those data, and in order to estimate the system stability, such that each of the branches would be able to withstand the expected load, the amount of the margin of reactive and/or active load is defined. The proposed value of this load as well as the proposed voltage profiles are determined on the basis of the known power flow technique and the saddle-node bifurcation theory.

SUMMARY OF THE INVENTION

The method for the identification of weak and/or strong nodes of an electric power transmission system according to the invention, which employs known computational methods regarding power flow in the nodes and branches of the electric power transmission system, and in which functional relations between active and reactive loads for that system are analyzed, consists in subjecting the characteristic electric parameters of nodes and branches of the power system to computational treatment to achieve power flow equations for all that system's nodes with assumed 100 percent value of the system's basic load, and calculating complex voltage values in those nodes. Then an electric model of a system branch located between two receiver nodes is assumed, and a limiting curve P-Q showing the functional relation between active load and reactive load for the assumed electric model of the branch is constructed, and a base load point for that branch is assumed. Then the branch coefficient of voltage stability is determined for the analyzed system branch, thereafter the total system load is increased to overload the system up to 120% of the base load, and all steps relating to the determination of the voltage stability coefficient for the analyzed branch at the predetermined overload of the system are repeated. The numerical value of the voltage stability coefficient is compared with the threshold value considered to be a safe margin for maintaining voltage stability in the analyzed branch, the value of the difference between the values of the branch voltage stability coefficients determined for both types of system load is checked, i.e. whether it is more than, equal to, or less than zero, and on the basis of those comparisons the analyzed branch is identified as weak or strong.

The branch coefficient of voltage stability is preferably calculated from the following relation:

$$c_{vc} = d_{vc} \cdot (1 - p_{vc}),$$

where:

$d_{vc} = \overline{(p_{cr} - p_b)^2 + (q_{cr} - q_b)^2}$—is the distance between the base point of branch load and the critical point on the P-Q curve, and $$p_{vc} = 1 - \frac{\int_{P_{min}}^{P_{max}} \sqrt{\frac{-\frac{Q_{min}}{1 - \frac{X_b B_b}{2}} + \frac{0.25}{(1 - \frac{X_b B_b}{2})^2}} \left( -\left(1 - \frac{X_b B_b}{2}\right) P^2 + \frac{0.25}{1 - \frac{X_b B_b}{2}} - Q_{min} \right) dP}}{(P_{max} - P_{min}) \cdot (Q_{max} - Q_{min})}$$

—is the probability of occurrence of voltage instability in the analyzed branch.

Preferably, the analyzed branch is considered weak where the value of the branch voltage stability coefficient for 100% system load is less than 0.125 and at the same time the difference between the coefficient determined for the given node at total system load equal to 100% and the coefficient determined for the given node at total system load equal to 120% is more than zero, or the analyzed branch is considered strong where the value of the branch voltage stability coefficient for 100% system load is less than 0.125, the difference between the coefficient determined for the given node at total system load equal to 100% and the coefficient determined for the given node at total system load equal to 120% being less than or equal to zero.

The advantage of the inventive method is the ability to determine weak and/or strong branches of an electric power transmission system without the need for making a multi-variant analysis of power flow in the power system considering the critical loads and cutouts of individual system elements.

BRIEF DESCRIPTION OF THE DRAWINGS

The method according to the invention will be presented more closely by its embodiment and a drawing, where.

DETAILED DESCRIPTION OF THE INVENTION

Figure 1:
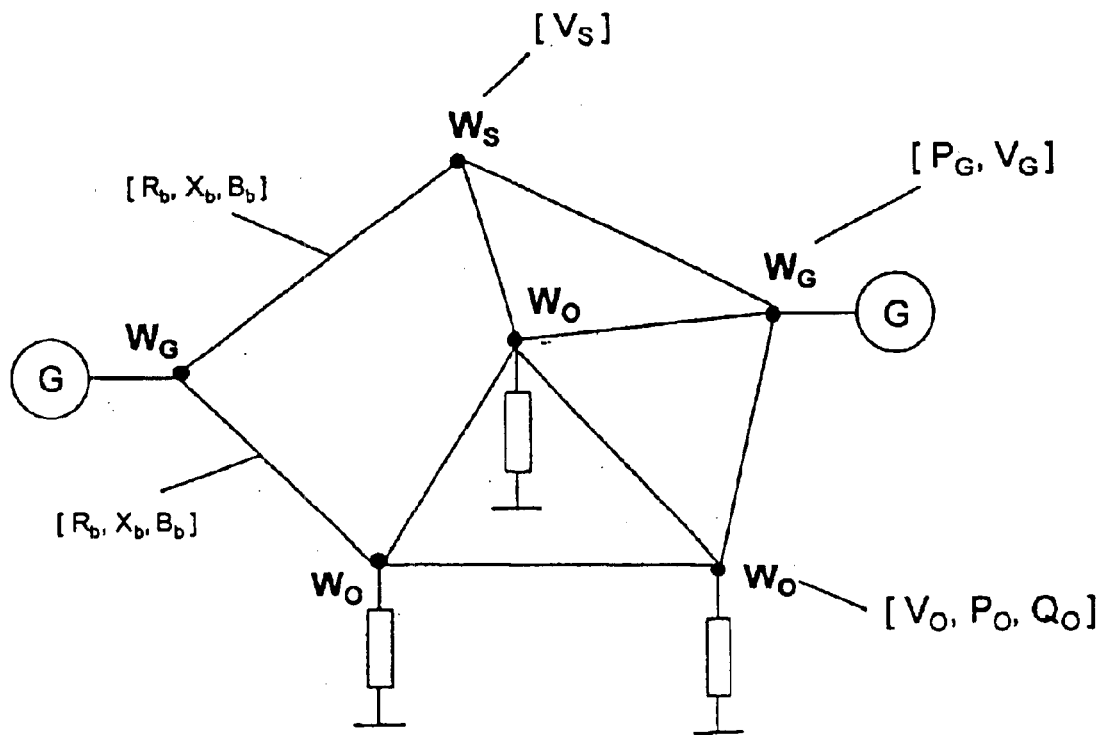
FIG. 1 shows a schematic diagram of the power system structure, FIG. 2—a diagram of an electric model of the power system branches, FIG. 3—an exemplary diagram, in relative units, of the relation between active load P and reactive load Q for a branch with indicated base load point N and critical point C, FIG. 4—an exemplary diagram showing the relation between active load P and reactive load Q for the branch with indicated voltage stability area, and FIG. 5—the set of operations necessary to realise the method.

In the schematic presentation in FIG. 1 the electric power transmission system is a network formed by feed generators G connected with generator nodes $W_G$ which in turn are connected to at least one receiver node $W_O$ by means of appropriate transmission lines. At least one of the generator nodes $W_G$ is connected through a transmission line with a flow node $W_S$ which in turn is connected to at least one receiver node $W_O$. Further on in the description, all transmission lines are called system branches.

For the network system formed as shown above, in the first stage of the realisation of the method, electric parameters in the system's nodes and in its branches are measured. In generator nodes $W_G$ voltage $V_G$ and active load $P_G$ are measured. In receiver nodes $W_O$ voltage $V_O$, active load $P_O$ and reactive load $Q_O$ are measured. In flow node $W_S$ voltage $V_S$ is measured. In branches connecting the analysed generator nodes $W_G$ with flow node $W_S$ and with receiver nodes $W_O$ resistance $R_b$, reactance $X_b$ and susceptance $B_b$ are measured.

Measurement data are fed to a control device, not shown in the drawing, which is a computer provided with suitable software, where the data are stored in its memory in a suitable digital form.

Figure 5:
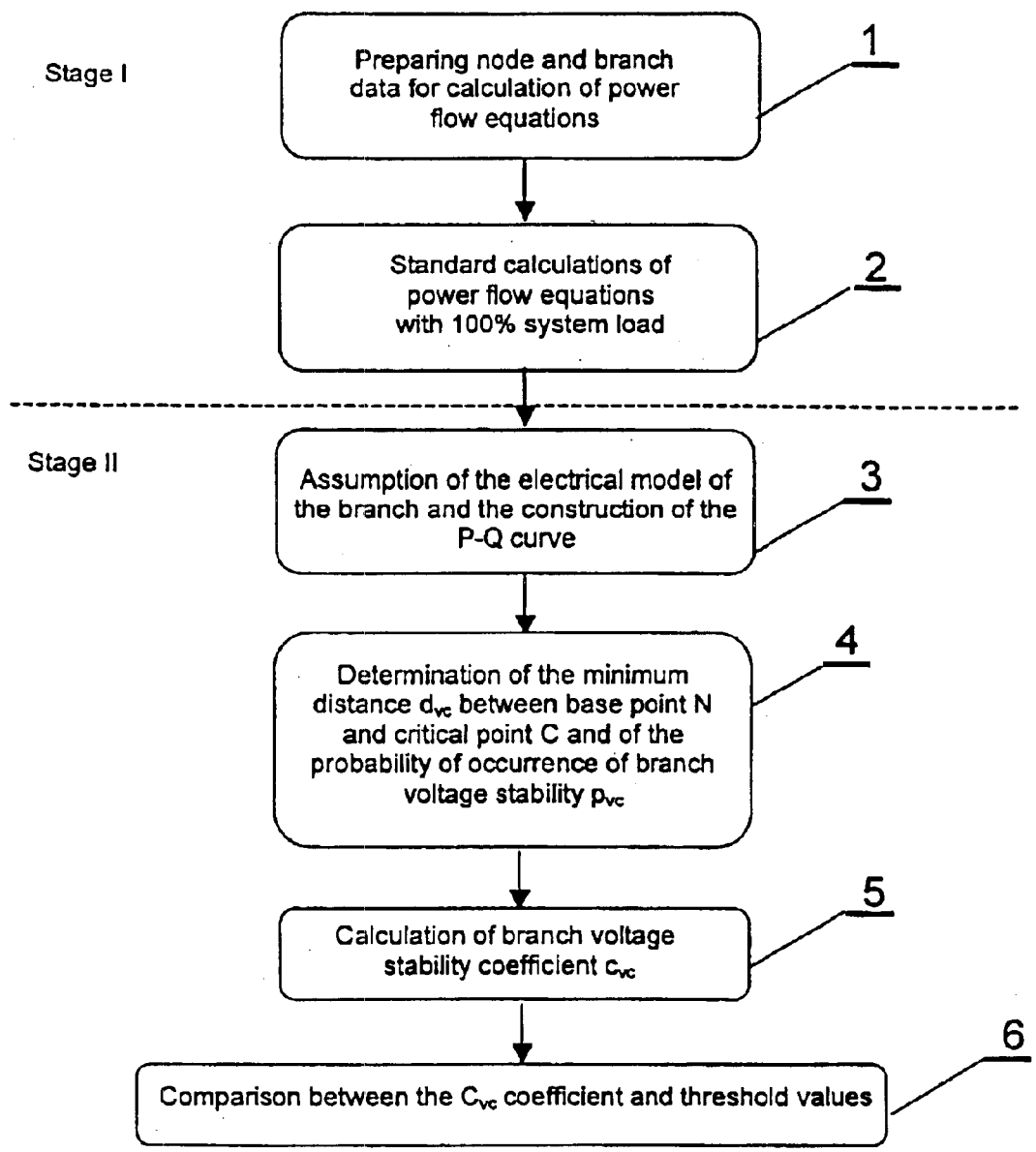

Operations regarding data preparation are shown in FIG. 5 as block 1.

When all the necessary data have been collected, the control device computes the equations of power flow in all nodes $W_G$, $W_O$, and in node $W_S$ of the system, using known mathematical methods suitable for such purposes, such as, for instance, the Newton's method. For the computation, 100% total system load is assumed. The result of the conducted calculations concerning power flow are complex values of voltages in all nodes of the system.

The computing operations concerning the standard calculation of power flow, with a 100% system load, are shown in FIG. 5 as block 2.

Figure 2:
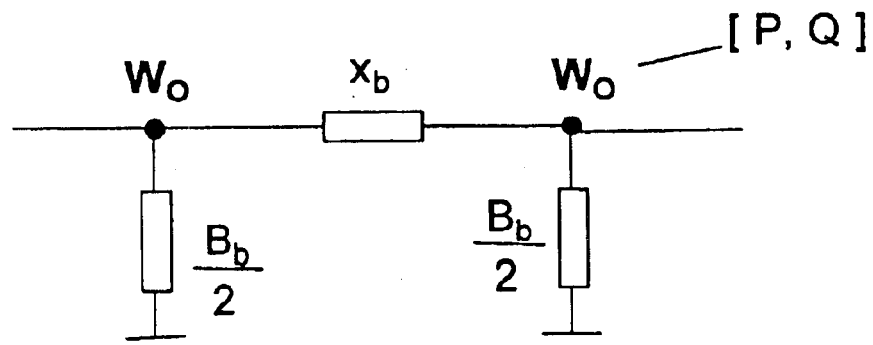

Then, in stage two, an electrical model of the branch located between the receiver nodes $W_o$ (FIG. 2) is assumed, to which branch reactance $X_b$ and susceptance $B_b$ are applied, and active load P and reactive load Q which apply a load on the branch in one receiver node $W_o$ are assumed. Between the receiver nodes $W_o$ and the earth half susceptance $B_b$ value is applied.

Figure 3:
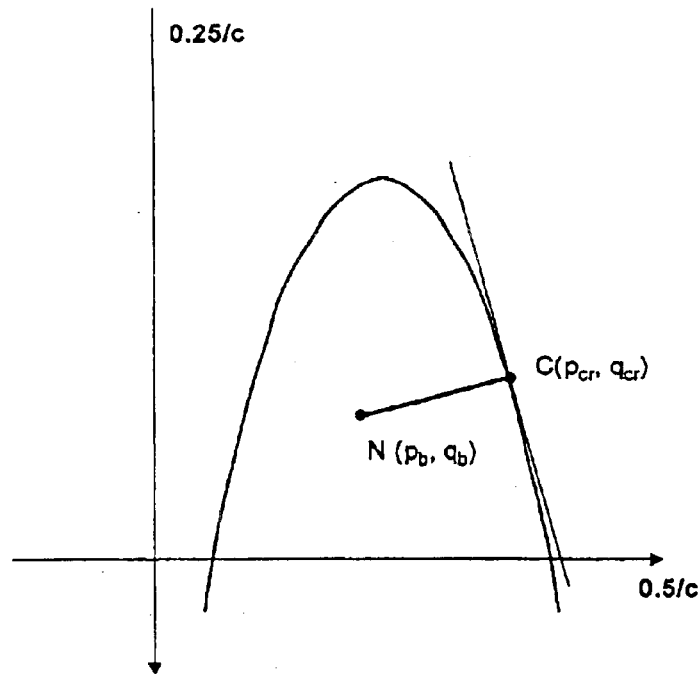

For the model assumed as described above a limiting curve of relation between active load P and reactive load Q is plotted, so called P-Q curve, which is presented in a cartesian coordinate system (FIG. 3) and described in relative units by the following equation:

$$q = -cp^2 + \frac{0.25}{c}, \qquad /1/$$

where:

$$c = 1 - \frac{X_b B_b}{2}$$

—coefficient in the equation of the P-Q curve plotted in relative units.

Operations connected with the assumption of the electrical model of the branch and the construction of the limiting curve P-Q are indicated in FIG. 5 as block 2.

Next, for the base load point N, indicated in the coordinate system with the curve P-Q, defined by coordinates ($p_b$, $q_b$), which characterizes the base load of the branch, we determine the minimum distance between the point N and the critical point C of coordinates ($p_{cr}$, $q_{cr}$) situated on the previously plotted curve P-Q. This distance is found by determining the perpendicular to the tangent to the curve P-Q in the given critical point ($p_{cr}$, $q_{cr}$) situated on the P-Q curve, which perpendicular is defined by the following relation:

$$q - q_{cr} = -\frac{1}{\dot{q}(p_{cr})}(p - p_{cr}), \qquad /2/$$

where:

p and q—are active and reactive load as the variables of that equation, $p_{cr}$ and $q_{cr}$—are the values of the coordinates of active and reactive load in the branch during critical operating conditions at the the voltage stability limit.

By differentiating the equation of the limiting curve P-Q in the point ($p_{cr}$, $q_{cr}$) we receive the following relation:

$$\dot{q}(p_{cr}) = -2cp_{cr} \qquad /3/.$$

The equation of the straight line passing through any two points can take the following form:

$$q - q_{cr} = \frac{q_b - q_{cr}}{p_b - p_{cr}}(p - p_{cr}), \qquad /4/$$

after which, by inserting the relations presented in formulas /3/ and /4/ into the equation /2/ we receive the following equation:

$$2cp_{cr}(q_{cr} - q_b) = (p_{cr} - p_b) \qquad /5/.$$

Then, inserting the equation /1/ into the equation /5/ and transforming it in a suitable manner, we receive a relation from which we can determine the value of the coordinate $p_{cr}$ of the critical point C, which has the following form:

$$p_{cr}^3 + \left(\frac{q_b}{c} + \frac{1}{4c^2}\right)p_{cr} - \frac{p_b}{2c^2} = 0. \quad /6/$$

The solution of the above equation /6/ is the value of the coordinate $p_{cr}$ of the critical point C, which is:

$$p_{cr} = \sqrt[3]{-\frac{p_b}{2c^2} + \sqrt{\left(\frac{\frac{q_b}{c} + \frac{1}{4c^2}}{3}\right)^3 + \left(\frac{-\frac{p_b}{2c^2}}{2}\right)^2}} + \sqrt[3]{-\frac{p_b}{2c^2} - \sqrt{\left(\frac{\frac{q_b}{c} + \frac{1}{4c^2}}{3}\right)^3 + \left(\frac{-\frac{p_b}{2c^2}}{2}\right)^2}}. \quad /7/$$

Then the value of the coordinate $q_{cr}$ of the critical point C is determined from the following relation:

$$q_{cr} = -cp_{cr}^2 + \frac{0.25}{c}. \quad /8/$$

Having determined the coordinates of the critical point C, we determine the minimum distance between the base point N of coordinates ($p_b$, $q_b$) and the critical point C of determined coordinates ($p_{cr}$, $q_{cr}$) situated on the limiting curve P-Q from this relation:

$$d_{vc} = \overline{\sqrt{(p_{cr}-p_b)^2+(q_{cr}-q_b)^2}} \quad /9/,$$

where:

$d_{vc}$—is the distance between the base point N of branch load and the critical point C on the curve P-Q, $p_{cr}$—is the values of the coordinates of active load in the branch during critical operating conditions at the voltage stability limit, $q_{cr}$—is the values of the coordinates of reactive load in the branch during critical operating conditions at the voltage stability limit, $p_b$—is the values of the coordinates of the base point of active load in the analysed branch, a $q_b$—is the values of the coordinates of the base point of reactive load in the analysed branch.

Figure 4:
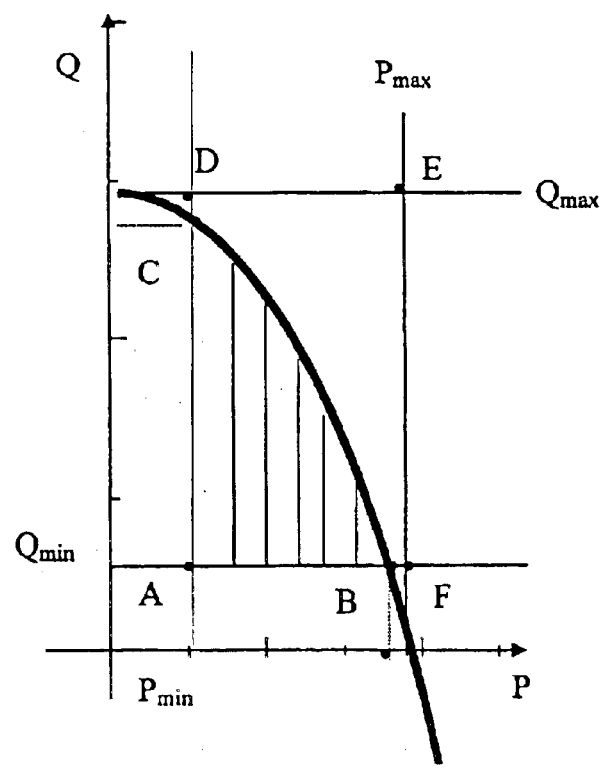

In the next stage, using the previously determined limiting curve P-Q, in the analysed branch of the system, admissible variations in the branch active load P within the range $P_{min} \leq P \leq P_{max}$ are assumed, and admissible variations in the branch reactive load Q within the range $Q_{min} \leq Q \leq Q_{max}$ are assumed, and for so assumed loads the probability of occurrence of voltage instability is calculated. Moreover, it is assumed that all base points situated within the area formed by the branch limiting loads $P_{min}$, $P_{max}$, $Q_{min}$ i $Q_{max}$, and at the same time situated below the limiting curve P-Q, conform with stable operating conditions of the branch. On the other hand, the remaining base points of the branch situated within the area formed by the branch limiting loads $P_{min}$, $P_{max}$, $Q_{min}$ i $Q_{max}$, and at the same time situated above the limiting curve P-Q, correspond to unstable operating conditions of the branch /FIG. 4/.

In this way, for each branch of the system the probability of occurrence of voltage instability is determined using the geometrical definition of probability as:

$$p_{vc} = 1 - \frac{S_{in}}{S}, \quad /10/$$

where:

S—is the area of the quadrilateral ADEF defining the admissible variations in active load P and reactive load Q in the branch, A—is the point of the coordinates ($P_{min}$, $Q_{min}$), D—is the point of the coordinates ($P_{min}$, $Q_{max}$), E—the point of the coordinates ($P_{max}$, $Q_{max}$), F—the point of the coordinates ($P_{max}$, $Q_{min}$), S—$(P_{max}-P_{min})(Q_{max}-Q_{min})$, $S_{in}$—is the area of figure ABC formed as a common part of the quadrilateral ADEF and the area below the limiting curve P-Q.

The area $S_{in}$ of the figure ABC can be calculated from the following relation:

$$\int_{P_{min}}^{\sqrt{\frac{Q_{min}}{1-\frac{X_bB_b}{2}} + \frac{0.25}{\left(1-\frac{X_bB_b}{2}\right)^2}}} \left(-\left(1-\frac{X_bB_b}{2}\right)P^2 + \frac{0.25}{1-\frac{X_bB_b}{2}} - Q_{min}\right)dP. \quad /11/$$

By inserting the relation /11/ into the equation /10/ the probability of occurrence of voltage instability is determined, which takes the the following form:

$$p_{vc} = 1 - \frac{\int_{P_{min}}^{\sqrt{\frac{Q_{min}}{1-\frac{X_bB_b}{2}} + \frac{0.25}{\left(1-\frac{X_bB_b}{2}\right)^2}}} \left(-\left(1-\frac{X_bB_b}{2}\right)P^2 + \frac{0.25}{1-\frac{X_bB_b}{2}} - Q_{min}\right)dP}{(P_{max}-P_{min}) \cdot (Q_{max}-Q_{min})}, \quad /12/$$

where:

$P_{max}$—is the maximum value of the coordinates of active load in the branch during critical operating conditions at the voltage stability limit, $P_{min}$—is the minimum value of the coordinates of active load in the branch, $Q_{max}$—is the maximum value of the coordinates of reactive load in the branch during critical operating conditions at the voltage stability limit, $Q_{min}$—is the minimum value of the coordinates of reactive load in the branch.

Operations relating to the determination of the minimum distance $d_{vc}$ between the base point N and the critical point C and those relating to the determination of the probability of occurrence of voltage instability $p_{vc}$ are indicated in FIG. 5 as block 4.

Then the branch voltage stability coefficient $c_{vc}$ is calculated from the following relation:

$$c_{vc} = d_{vc} \cdot (1-p_{vc}) \quad /13/.$$

The calculation of the branch voltage stability coefficient is presented as block 5 in FIG. 5.

In the next operation, the total system load is increased to overload the system to 120% base load and the power flow equations for all nodes $W_G$, $W_O$ and for the system node $W_S$ are recalculated, using known mathematical methods suitable for such purposes, such as, for instance, the Newton's method. The result of the conducted calculations concerning power flow are complex values of voltages in all nodes of the system.

Then operations from stage two, consisting in the determination of the branch voltage stability coefficient $c_{vc}$ for the total system load increased to 120%, are repeated.

In the next operation, presented in FIG. 5 as block 6, the system branch is identified by comparing the numerical value of the coefficient $c_{vc}$ determined for the given branch at total system load equal to 100% with the assumed threshold value of 0.125, and at the same time it is determined whether the numerical value of the difference between the numerical value of the coefficient $c_{vc(100\%)}$, determined for the given branch at total system load equal to 100%, and the numerical value of the coefficient $c_{vc(120\%)}$, determined for the given branch at total system load equal to 120%, is more than, less than or equal to zero.

Where the value $c_{vc} \leq 0.125$ for total system load equal to 100% and the determined difference between the values of coefficients $c_{vc}$ for 100% and 120% total system load is more than zero, the examined branch is considered weak.

If $c_{vc} \leq 0.125$ and $c_{vc(100\%)} - c_{vc(120\%)} \leq 0$ then the examined branch is considered weak.

Where the value $c_{vc} \leq 0.125$ for total system load equal to 100% and the determined difference between the values of the coefficients $c_{vc}$ for 100% and 120% total system load is less than or equal to zero, the examined branch is considered strong.

If $c_{vc} \leq 0.125$ and $c_{vc(100\%)} - c_{vc(120\%)} \leq 0$ then the examined branch is considered strong.

Where $c_{vc} \geq 0.125$ for total system load equal to 100%, the examined branch is considered strong.

What is claimed is:

1. A method for the identification of weak and/or strong branches of an electric power transmission system which employs known analytical methods appropriate to power flow in nodes and branches of the power transmission system and which analyzes functional relations between active and reactive load for this system, wherein the electric parameters characterizing the nodes and branches of the power transmission system are subjected to computational treatment in order to obtain equations of power flow in all nodes of the system at a first load type or base system load, which is used to calculate complex voltage values in those nodes, and a branch voltage stability system coefficient $/c_{vc}/$ for an analyzed system branch situated between two receiver nodes, after which the total system load is increased and all operations relating to the determination of the voltage stability coefficient for the analyzed system branch at the predetermined system overload are repeated at a second load type or overload system load, and then the numerical value of one of the branch voltage stability coefficients $/c_{vc}(1)/$, $/c_{vc}(2)/$ determined for both types of system load is compared with a threshold value considered to be a safe margin for maintaining voltage stability for the analyzed branch, and the value of the difference between the values of the branch voltage stability coefficients determined for both types of system load is checked whether it is more than, equal to or less than zero, and on the basis of those comparisons the analyzed branch is identified as weak or strong.

2. The method according to claim 1, wherein for the calculation of the branch voltage stability coefficient $/c_{vc}/$ for the analyzed system branch an electrical model of the system branch is assumed and a limiting curve $/P-Q/$ is constructed, which shows the functional relation between the reactive load $/Q/$ and the active load $/P/$ for the assumed electrical model of the branch, and a base load point for that branch is assumed.

3. A method according to claim 1, wherein the analyzed branch is considered weak where the value of the branch voltage stability coefficient $/c_{vc}(1)/$ for base system load is less than a threshold value considered to be a safe margin for maintaining voltage stability for the analyzed branch while the difference between the coefficient $/c_{vc}(1)/$ determined for the given branch at base system load and the coefficient $/c_{vc}(2)/$ determined for the given branch at overload system load is more than zero, or the analyzed branch is considered strong where the value of the branch voltage stability coefficient $/c_{vc}(1)/$ for base system load is less than a threshold value considered to be a safe margin for maintaining voltage stability for the analyzed branch while the difference between the coefficient $/c_{vc}(1)/$ determined for the given branch at base system load and the coefficient $/c_{vc}(2)/$ determined for the given branch at overload system load is less than or equal to zero.

4. A method according to claim 2, wherein the branch voltage stability coefficient $/c_{vc}/$ is calculated from this relation:

$$c_{vc} = d_{vc}(1 - p_{vc}),$$

where:

$d_{vc} = \sqrt{(p_{cr} = p_b)^2 + (q_{cr} = q_b)^2}$—is the distance between the base point of the branch load and the critical point on the curve P-Q, $p_{cr}$—is the values of the branch active load coordinates during critical operating conditions at the voltage stability limit, $q_{cr}$—is the values of the branch reactive load coordinates during critical operating conditions at the voltage stability limit, $p_b$—is the values of the coordinates of the base point of active load in the analyzed branch, $q_b$—is the values of the coordinates of the base point of reactive load in the analyzed branch, and $p_{vc}$ is the probability of occurrence of voltage instability in the analyzed branch $$p_{vc} = 1 - \frac{\int_{P_{min}}^{} \sqrt{1 - \frac{Q_{min}}{\frac{X_b B_b}{2}} + \frac{0.25}{\left(1 - \frac{X_b B_b}{2}\right)^2}} \left(-\left(1 - \frac{X_b B_b}{2}\right)P^2 + \frac{0.25}{1 - \frac{X_b B_b}{2}} - Q_{min}\right) dP}{(P_{max} - P_{min}) \cdot (Q_{max} - Q_{min})}.$$

5. The method according to claim 1, wherein the second load type or overload system load is an overload of the system up to 120% base system load.

6. A method according to claim 4, wherein the probability of occurrence of voltage instability $p_{vc}$ in the analyzed branch is calculated according to this formula:

$$p_{vc} = 1 - \frac{\int_{P_{min}} \sqrt{\frac{Q_{min}}{1-\frac{X_bB_b}{2}} + \frac{0.25}{(1-\frac{X_bB_b}{2})^2}} \left(-\left(1-\frac{X_bB_b}{2}\right)P^2 + \frac{0.25}{1-\frac{X_bB_b}{2}} - Q_{min}\right)dP}{(P_{max}-P_{min}) \cdot (Q_{max}-Q_{min})}$$

where:

$P_{max}$—is the maximum value of the coordinates of active load in the branch during critical operating conditions at the voltage stability limit, $P_{min}$—is the minimum value of the coordinates of active load in the branch, $Q_{max}$—is the maximum value of the coordinates of reactive load in the branch during critical operating conditions at the voltage stability limit, $X_b$—is the reactance of the analyzed branch, and Bb is its susceptance.

7. A method according to claim 3, wherein the threshold value considered to be a safe margin for maintaining voltage stability for the analyzed branch is equal to 0.125.

8. A method according to claim 2, wherein the analyzed branch is considered weak where the value of the branch voltage stability coefficient /$c_{vc}(1)$/ for base system load is less than a threshold value considered to be a safe margin for maintaining voltage stability for the analyzed branch while the difference between the coefficient /$c_{vc}(1)$/ determined for the given branch at base system load and the coefficient /$c_{vc}(2)$/ determined for the given branch at overload system load is more than zero, or the analyzed branch is considered strong where the value of the branch voltage stability coefficient /$c_{vc}(1)$/ for base system load is less than a threshold value considered to be a safe margin for maintaining voltage stability for the analyzed branch while the difference between the coefficient /$c_{vc}(1)$/ determined for the given branch at base system load and the coefficient /$c_{vc}(2)$/ determined for the given branch at overload system load is less than or equal to zero.

* * * * *